(12) United States Patent
Perets et al.

(10) Patent No.: US 9,014,119 B2
(45) Date of Patent: Apr. 21, 2015

(54) SPECTRUM ESTIMATION FOR LOW-LOAD LTE SIGNALS

(71) Applicant: Marvell International Ltd., Hamilton (BM)

(72) Inventors: Yona Perets, Ra'anana (IL); David Ben-Eli, Modiin (IL); Daniel Yellin, Ra'anana (IL)

(73) Assignee: Marvell International Ltd., Hamilton (BM)

( * ) Notice: Subject to any disclaimer, the term of this patent is extended or adjusted under 35 U.S.C. 154(b) by 137 days.

(21) Appl. No.: 13/760,084

(22) Filed: Feb. 6, 2013

(65) Prior Publication Data

US 2013/0201853 A1 Aug. 8, 2013

Related U.S. Application Data

(60) Provisional application No. 61/595,870, filed on Feb. 7, 2012.

(51) Int. Cl.
*H04W 4/00* (2009.01)
*H04W 24/00* (2009.01)
*H04W 48/16* (2009.01)
*H04W 48/18* (2009.01)

(52) U.S. Cl.
CPC .............. *H04W 24/00* (2013.01); *H04W 48/16* (2013.01); *H04W 48/18* (2013.01)

(58) Field of Classification Search
CPC ..... H04W 48/18; H04W 88/06; H04W 36/14; H04B 17/0042
See application file for complete search history.

(56) References Cited

U.S. PATENT DOCUMENTS

| 8,498,640 B2 * | 7/2013 | Reial et al. ..................... 455/434 |
| 2004/0058679 A1 * | 3/2004 | Dillinger et al. .............. 455/439 |

OTHER PUBLICATIONS

3GPP TS 36.211, "3rd Generation Partnership Project; Technical Specification Group Radio Access Network; Evolved Universal Terrestrial Radio Access (E-UTRA); Physical Channels and Modulation (Release 8)", Version 8.8.0, chapter 6.10, pp. 65-72, Sep. 2009.

* cited by examiner

Primary Examiner — Fan Ng

(57) ABSTRACT

A method includes receiving a signal in a communication terminal. A power spectral density, which the signal would have under full-load conditions of a transmitter transmitting the signal, is estimated based on the received signal. An operation is performed in the communication terminal using the estimated power spectral density.

18 Claims, 2 Drawing Sheets

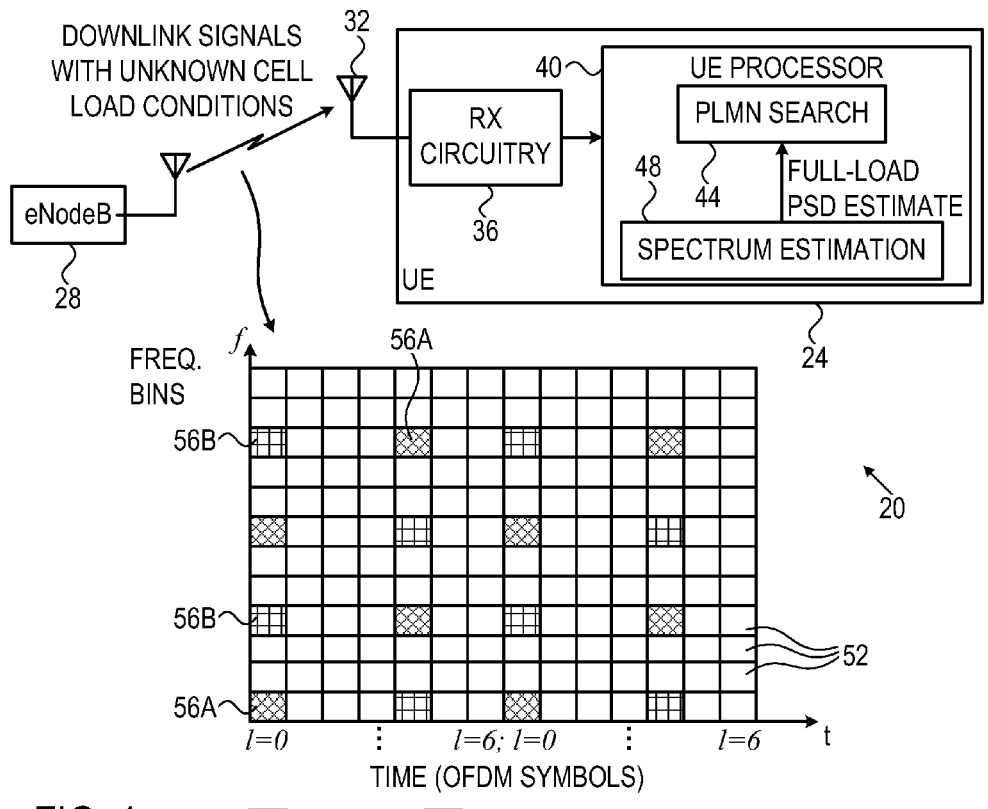
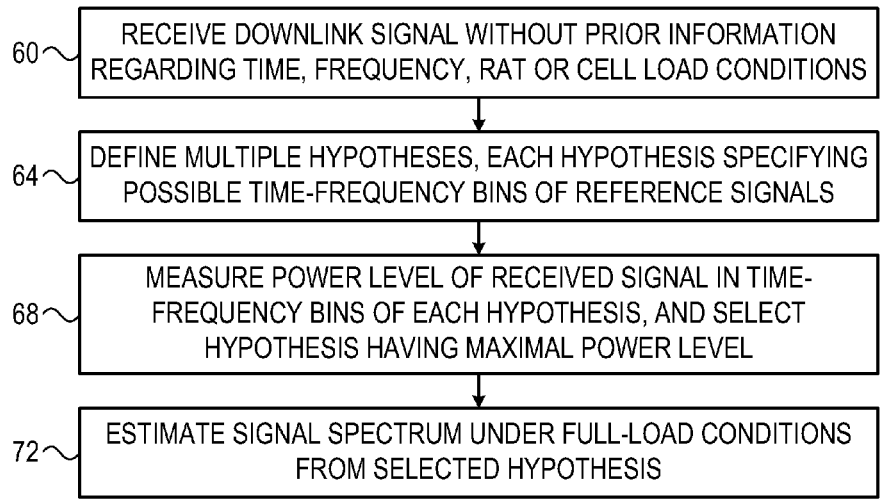
FIG. 1
FIG. 2

SPECTRUM ESTIMATION FOR LOW-LOAD LTE SIGNALS

CROSS-REFERENCE TO RELATED APPLICATIONS

This application claims the benefit of U.S. Provisional Patent Application 61/595,870, filed Feb. 7, 2012, whose disclosure is incorporated herein by reference.

FIELD OF THE DISCLOSURE

The present invention relates generally to wireless communication, and particularly to methods and systems for estimating spectral density of received signals.

BACKGROUND

In various communication systems, a transmitter transmits known reference signals, and receivers perform measurements on the reference signals. Reference signals are used, for example, in Evolved Universal Terrestrial Radio Access (E-UTRA) systems, also referred to as Long Term Evolution (LTE) systems. The formats and use of reference signals in LTE systems are specified by the Third Generation Partnership Project (3GPP), in "Technical Specification Group Radio Access Network; Evolved Universal Terrestrial Radio Access (E-UTRA); Physical Channels and Modulation (Release 8)," TS 36.211, version 8.8.0, September, 2009, section 6.10, which is incorporated herein by reference.

The description above is presented as a general overview of related art in this field and should not be construed as an admission that any of the information it contains constitutes prior art against the present patent application.

SUMMARY

An embodiment that is described herein provides a method including receiving a signal in a communication terminal. A power spectral density, which the signal would have under full-load conditions of a transmitter transmitting the signal, is estimated based on the received signal. An operation is performed in the communication terminal using the estimated power spectral density.

In some embodiments, performing the operation includes searching in the terminal, using the estimated power spectral density, for a Public Land Mobile Network (PLMN) with which to communicate. In an embodiment, performing the operation includes identifying a Radio Access Technology (RAT) used by the PLMN.

In some embodiments, estimating the power spectral density includes defining multiple hypotheses, each hypothesis specifying a respective set of one or more of time-frequency bins in which the signal is hypothesized to comprise reference signals, measuring a respective received power level of the signal in each of the sets, selecting a hypothesis in which the received power level is maximal, and estimating the power spectral density under the full-load conditions based on the selected hypothesis.

In an example embodiment, defining the hypotheses includes specifying the time-frequency bins of the multiple hypotheses in a given frequency sub-band, and estimating the power spectral density under the full-load conditions includes substituting the measured power level of the selected hypothesis to serve as the estimated power spectral density for the frequency sub-band. In an embodiment, estimating the power spectral density includes processing the frequency sub-band independently of other frequency sub-bands of the signal.

In another embodiment, defining the multiple hypotheses includes, for a communication protocol that transmits the reference signals in one or more predefined patterns of the time-frequency bins, defining multiple shifts, in at least one of time and frequency, that cover possible shifts of the predefined patterns. In an embodiment, the one or more predefined patterns correspond to respective reference symbol patterns used by transmit antennas of the transmitter.

In yet another embodiment, defining the hypotheses includes defining multiple time shifts of a predefined pattern of the reference signals, selecting the hypothesis includes choosing, for each frequency bin, the hypothesis having the maximal received power level for the frequency bin, and estimating the power spectral density includes substituting the maximal received power level to serve as the estimated power spectral density for the frequency bin. In an embodiment, estimating the power spectral density includes computing a maximum of the maximal received power level over the frequency bin and one or more neighboring frequency bins, and substituting the computed maximum to serve as the estimated power spectral density for the frequency bin.

In still another embodiment, receiving the signal includes receiving a Time Division Duplex (TDD) signal having a period, and measuring the received power level includes evaluating the power level over at least the period.

There is additionally provided, in accordance with an embodiment that is described herein, apparatus including reception circuitry and a processor. The reception circuitry is configured to receive a signal over a mobile telecommunications air interface. The processor is configured to estimate, based on the received signal, a power spectral density that the signal would have under full-load conditions of a transmitter transmitting the signal, and to perform an operation using the estimated power spectral density.

In some embodiments, a communication terminal includes the disclosed apparatus. In some embodiments, a chipset for processing signals in a communication terminal includes the disclosed apparatus.

The present disclosure will be more fully understood from the following detailed description of the embodiments thereof, taken together with the drawings in which:

BRIEF DESCRIPTION OF THE DRAWINGS

FIG. 1 is a block diagram that schematically illustrates a wireless communication system, in accordance with an embodiment that is described herein;

FIG. 2 is a flow chart that schematically illustrates a method for full-load spectrum estimation, in accordance with an embodiment that is described herein.

DETAILED DESCRIPTION OF EMBODIMENTS

Figure 3:
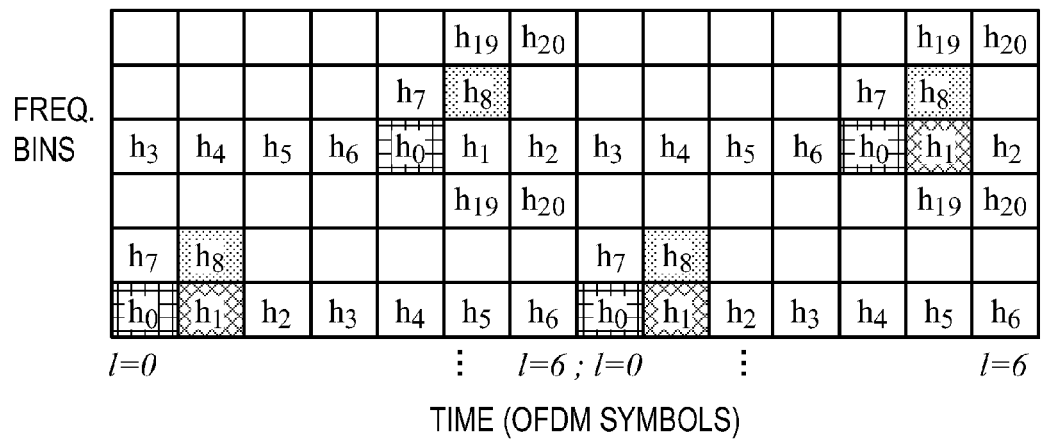
FIGS. 3 and 4 are diagrams that schematically illustrate hypotheses used for full-load spectrum estimation, in accordance with embodiments that are described herein.

In some communication systems, the traffic load of a transmitter varies over time, and these load variations cause the Power Spectral Density (PSD) of the transmitted signal to change accordingly. Consider, for example, a base station that serves mobile communication terminals. The traffic load of the base station may vary over time due to variations in the number of served terminals and/or the traffic volume transmitted to each terminal.

In the present context, the term "traffic load" or simply "load" refers to the fraction of the channel resources that are actually used by the transmitter at a given time, out of the total available channel resources. When the transmitter transmits signals in multiple time-frequency bins, for example, the load of the transmitter refers to the percentage of available time-frequency bins that are actually used for transmission at a given time. Full-load conditions, for example, occur when the transmitter utilizes all or nearly all available channel resources.

When the transmitter is fully-loaded, i.e., fully utilizes its available channel resources for transmission, the PSD is typically uniform across the spectrum that is allocated to the transmitter. Under low-load or otherwise partial-load conditions, the PSD typically deviates from the full-load distribution because of partial utilization of time and/or frequency.

Such variations in PSD are problematic in some scenarios. Consider, for example, a mobile communication terminal that estimates the PSD of received signals as a means for identifying candidate wireless networks with which to communicate. Variations in PSD as a function of changing traffic load may distort the terminal's estimation measurements and impact the performance of the network search process.

Embodiments that are described herein provide improved methods and systems for spectrum estimation. In some embodiments, a receiver receives a signal that was transmitted under certain load conditions of the transmitter. Based on the received signal, the receiver estimates the PSD that the signal would have under full-load conditions, regardless of the actual load conditions under which the signal was transmitted.

In other words, although the received signal may have been transmitted under partial-load conditions, the receiver is able to estimate the PSD that would have been measured under full-load conditions. The full-load PSD reflects the entire spectrum that is allocated to the transmitter, rather than the actual spectrum utilization at a given point in time.

When the disclosed technique is implemented in a mobile communication terminal, for example, the estimated full-load PSD can be used as part of a network search process (sometimes referred to as "PLMN search") performed in the terminal. The PLMN search thus becomes faster, more accurate and more robust, since it is insensitive to the varying traffic load conditions of the base stations.

In some embodiments, the receiver uses the fact that the signal comprises reference signals whose frequency, timing and power level does not depend on load conditions. LTE downlink signals, for example, typically comprise Common Reference Signals (CRSs) that are distributed in known periodic patterns of time-frequency bins. In an embodiment, the receiver identifies the applicable pattern, explicitly or implicitly, and is thus able to measure the reference signal power level. Having measured the reference signal power level, the receiver substitutes this power level in the relevant frequency sub-bands, so as to produce the estimated full-load PSD.

In practice, even though the patterns of reference signals are known to the receiver, the receiver often has no prior information regarding the specific pattern being used in the received signal, or the time-frequency offset of the pattern. Moreover, when the receiver carries out the spectrum estimation process, it may be unsynchronized in time and/or frequency with the actual transmitted signal, since it is still not aware of the actually-used frequency channel or its timing. Thus, in some embodiments the receiver defines multiple hypotheses. Each hypothesis corresponds to a respective set of one or more time-frequency bins that is hypothesized to comprise the reference signals.

The receiver measures the received power level in each set, i.e., for each hypothesis, and selects the hypothesis having the highest received power level. The receiver then estimates the full-load PSD using the selected hypothesis. Several example schemes of defining and testing such hypotheses are described herein.

FIG. 1 is a block diagram that schematically illustrates a wireless communication system 20, in accordance with an embodiment that is described herein. In the present example, system 20 operates in accordance with the LTE specifications, cited above. In alternative embodiments, however, system 20 may operate in accordance with any other suitable communication standard or protocol.

System 20 comprises a mobile communication terminal 24 (referred to in LTE terminology as User Equipment—UE) that communicates with a base station 28 (referred to as eNodeB in LTE terminology). UE 24 comprises one or more antennas 32, reception circuitry 36, and a UE processor 40. Reception circuitry 36 typically receives downlink Radio Frequency (RF) signals via antenna 32, down-converts the signals to baseband, digitizes the baseband signals and provides the digital signals to UE processor 40.

UE processor 40 processes the digital signals. Amongst other tasks, the UE processor carries out a process that searches for candidate Public Land Mobile Networks (PLMNs) with which to communicate. The example of FIG. 1 shows a single base station, such as an LTE compliant eNodeB, for the sake of clarity, but in real-life scenarios the UE often receives signals from multiple Base stations (BSs). The BSs may belong to various PLMNs operating in various spectral bands and in accordance with various Radio Access Technologies (RATs). UE processor 40 comprises a PLMN search unit 44, which carries out the PLMN search process. Any suitable PLMN search process can be used.

In the disclosed embodiments, UE processor 40 comprises a spectrum estimation unit 48. Unit 48 estimates the PSD that the downlink signal would have if base station 28 were to operate under full-load conditions, using techniques that are more fully described below. Spectrum estimation unit 48 provides the estimated full-load PSD as input to PLMN search unit 44. By operating on the estimated full-load PSD (as opposed to the actual PSD of the received signal), PLMN search unit 44 is able to identify PLMN characteristics (e.g., channel bandwidth, channel spacing or RAT) with better accuracy and reliability.

The UE configuration shown in FIG. 1 is an example configuration, which is depicted in a highly simplified manner solely for the sake of clarity. In alternative embodiments, any other suitable UE configuration can be used. UE elements that are not mandatory for understanding of the disclosed techniques, such as elements related to uplink transmission, have been omitted from the figure for the sake of clarity.

In various embodiments, some or all of the elements of UE 24, e.g., reception circuitry 36 and UE processor 40 including units 44 and 48, are implemented in hardware. For example, reception circuitry 36 may be implemented using one or more Radio Frequency Integrated Circuits (RFICs), and UE processor 40 may be implemented using one or more Field-Programmable Gate Arrays (FPGAs) or Application-Specific Integrated Circuits (ASICs). In alternative embodiments, certain elements of UE 24 are implemented in software, or using a combination of hardware and software elements. Some of the elements of UE 24, e.g., reception circuitry 36 and UE processor 40, may be implemented in a signal-processing chipset.

In some embodiments, certain UE elements, for example the functions of unit 44 and/or unit 48, are implemented in a programmable processor, which is programmed in software to carry out the functions described herein. The software may be downloaded to the processor, in whole or in part, in electronic form, for example, over a network, or it may, alternatively or additionally, be provided and/or stored on non-transitory tangible media, such as magnetic, optical, or electronic memory.

The bottom of FIG. 1 illustrates the structure of the downlink signal transmitted by base station 28, in an example embodiment. The LTE signal comprises a sequence of Orthogonal Frequency Division Multiplexing (OFDM) symbols, each comprising multiple sub-carriers. The signal is thus transmitted in multiple time-frequency bins 52 that are referred to as Resource Elements (REs). The bandwidth of each RE 52 in this example is 15 KHz. The block of twelve REs of fourteen OFDM symbols is referred to as a resource block (RB), in the present example occupying 1 mS-by-180 KHz in the time-frequency plane. In alternative embodiments, any other suitable RE and RB dimensions can be used. Typically, the base station transmits multiple RBs in parallel in the frequency domain, within the spectrum that is allocated to the base station.

Under fully-loaded conditions, all or nearly all REs 52 are used for transmission and thus comprise some of the signal energy. Under low-load conditions, on the other hand, many of the REs are not used for transmission and comprise little or no energy.

Some of REs 52 comprise Common Reference Signals (CRSs). The CRSs are transmitted in a predefined pattern that typically depends on factors such as the base station ID, the number of base station antennas, and whether a short or long Cyclic Prefix (CP) is used. The CRSs are typically transmitted regardless of load conditions and at a fixed power level.

FIG. 1 shows, by way of example, two patterns of RSs denoted 56A and 56B that are marked using different shadings in the figure. These patterns are typically duplicated periodically in adjacent RBs. Pattern 56A is used when the base station comprises a single antenna, as well as by the first base station antenna in a two-antenna base station. Pattern 56B is used by the second base station antenna in a two-antenna base station. Patterns 56A and 56B are used in short CP mode. In some embodiments, UE processor 40 identifies the CRS pattern in the received signal, and estimates the full-load PSD based on the received power level of the CRSs.

Although the UE processor 40 is aware of the possible CRS patterns that may potentially exist in the received signal, it typically has no information as to the actual pattern being used and the time-frequency offset of the pattern. For example, during PLMN search, the UE processor is unaware of the base station ID or the number of base station antennas, and therefore cannot deduce the actual CRS pattern.

Thus, in some embodiments, UE processor 40 defines and tests multiple hypotheses. Each hypothesis specifies a different respective set of time-frequency bins that are hypothesized to comprise the CRSs. Testing a given hypothesis means verifying whether the corresponding set of time-frequency bins indeed comprises the CRSs. After finding the true hypothesis, UE processor 40 estimates the full-load PSD of the signal based on the measured power in the bins of this hypothesis.

FIG. 2 is a flow chart that schematically illustrates a method for full-load spectrum estimation, in accordance with an embodiment that is described herein. The method begins with reception circuitry 36 of UE 24 receiving a downlink signal, at a reception operation 60. Generally, UE 24 has no prior information as to the actual time offset, frequency offset, RAT or load conditions with which the signal is transmitted.

Spectrum estimation unit 48 in UE processor 40 of UE 24 defines multiple hypotheses, at a hypotheses definition operation 64. Each hypothesis specifies a respective set of one or more time-frequency bins in the received signal that are hypothesized to comprise the CRSs. Two examples of hypotheses definitions are shown in FIGS. 3 and 4 below.

Unit 48 measures the average power level of the received signal over each set of time-frequency bins, i.e., for each hypothesis, at a power measurement operation 68. Unit 48 then estimates the full-load PSD, i.e., the PSD that the received signal would have if base station 28 were to transmit at full load, at an estimation operation 72. Spectrum estimation unit 48 provides the full-load PSD to PLMN search unit 44 to assist in the PLMN search process. In some embodiments searching for PLMN also comprises identifying the RAT used by the PLMN.

Figure 4:
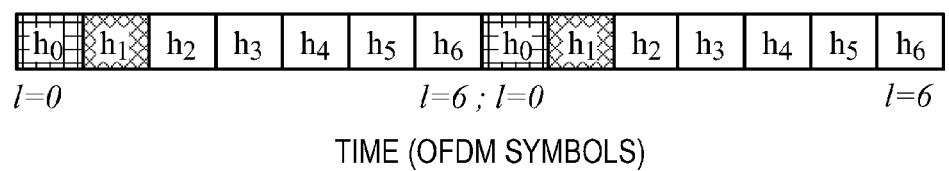

FIG. 3 is a diagram that schematically illustrates multiple hypotheses used for full-load spectrum estimation, in accordance with an embodiment that is described herein. In this embodiment, unit 48 defines and tests a total of twenty-one hypotheses for each block of six OFDM sub-carriers (90 KHz) by fourteen symbols (1 mS), assuming short CP mode. In this example, there are seven possible time bin offsets, multiplied by three possible frequency bin offsets, giving a total of twenty-one hypotheses marked $h_0 \ldots h_{20}$.

As can be seen in the figure, each hypothesis specifies a respective set of time-frequency bins that are hypothesized to comprise the CRSs. The various hypotheses are formed by applying respective time-frequency shifts to a predefined CRS pattern.

Typically, one of the sets of time-frequency bins will comprise the CRSs (which are transmitted regardless of loading conditions and at a fixed high power), whereas the other sets of time-frequency bins may or may not comprise data, depending on the base station load conditions. Therefore, the set of bins having the maximum received power level is either the set comprising the CRSs or it is one that has received power level close to it.

Thus, in some embodiments unit 48 measures the average received power level over the time-frequency bins of each hypothesis. In hypothesis $h_0$, for example, unit 48 measures the average power over bins [0/0], [4/3], [7/0] and [11/3], wherein the first index denotes the symbol index, and the second index denotes the frequency bin index.

Unit 48 then selects the hypothesis having the maximal received power level. Unit 48 substitutes this maximal power level as the power level of the entire six-sub-carrier (90 KHz) frequency sub-band in the estimated full-load PSD. The process is repeated in a similar manner for the other 90 KHz blocks. Each sub-band is typically processed independently of other sub-bands.

It is noted that, although UE 24 is not synchronized to base station 28 in time or frequency at this stage, and has no information as to the CP mode, the performance loss caused by this uncertainty is small. Longer averaging time (e.g., averaging over 5 mS instead of 1 mS) will typically improve the spectrum estimation accuracy at the expense of increased estimation time.

It is also noted that the estimated full-load PSD can be used for PLMN search in both third-generation RATs and higher (e.g., LTE) and second-generation RATs (e.g., GSM), because the spectral resolution of 90 KHz is lower than the RAT bandwidth in both cases (200 kHz for 2G and 3.84 MHz for 3G). The maximization operation introduces only a small amount of distortion into the estimation, since the signal spectrum over 90 KHz bandwidth is usually fairly flat.

FIG. 4 is a diagram that schematically illustrates multiple hypotheses used for full-load spectrum estimation, in accordance with an alternative embodiment that is described herein. In this example, spectrum estimation unit 48 estimates the full-load PSD in two stages.

In the first stage, unit 48 examines each 15 KHz frequency bin individually. In each frequency bin, unit 48 tests seven hypotheses (the seven possible time shifts of the CRS pattern) $h_0 \ldots h_6$ as shown in the figure. Unit 48 measures the average received power level over the REs of each hypothesis, i.e., the average power of time bins 0 and 7 for $h_0$, the average power of time bins 1 and 8 for $h_1$, and so on. The average power for the $k^{th}$ hypothesis in frequency bin f can be written as $$P_k(f) = \sum_{t=0,7} P(t+k, f))$$  Equation 1 wherein P(t,f)) denotes the received power level in the single RE at time t and frequency f.

Unit 48 then selects the hypothesis having the maximal average power in the frequency bin, and substitutes the maximal power level for this 15 KHz frequency bin in the estimated full-load PSD. The first stage is repeated for the different 15 KHz frequency bins. The value of the estimated full-load PSD for frequency bin f can thus be written as $$P_{est1}(f) = \text{Max}\{P_0(f), P_1(f), \ldots, P_6(f)\}$$  Equation 2:

The output of the first stage is a respective maximal average power value for each 15 KHz frequency bin. In the second stage, unit 48 replaces the maximal average power value of each 15 KHz frequency bin with the maximum over the value of this bin and one or more of its neighboring frequency bins. In the present example, the estimated full-load PSD for a given frequency bin is set to the maximum of $P_{est1}(f)$ in this bin and one neighboring bin on either side, i.e., a total of three bins.

For the general case of maximizing over N neighboring frequency bins, the estimated full-load PSD for frequency bin f is given by:

$$P_{est2}(f) = \text{Max}\{P_{est1}(k)\}$$  Equation 3:

wherein the maximum is taken over $$k = f - \left\lfloor \frac{N}{2} \right\rfloor \ldots f + \left\lfloor \frac{N}{2} \right\rfloor.$$

Spectrum estimation unit 48 provides the estimated full-load PSD $P_{est2}(f)$ to PLMN search unit 44, for use in the PLMN search process.

The scheme of FIG. 4 estimates the full-load PSD with a fine resolution of 15 KHz, as opposed to the 90 KHz resolution of the scheme of FIG. 3 above. The finer resolution may improve the performance of the PLMN search process. For example, when using the scheme of FIG. 4, the PLMN search process is able to assign respective scores to frequency channels with a fine resolution.

The schemes of FIGS. 3 and 4 are example schemes for estimating the full-load PSD based on multiple hypotheses as to the time-frequency locations of the reference signals. In alternative embodiments, unit 48 may use any other suitable estimation scheme.

In some cases, the downlink signal received by UE 24 is a Time Division Duplex (TDD) signal. In such a signal, in addition to varying traffic load, the received signal comprises periodic time intervals that are allocated to the uplink direction. These time intervals in the downlink signal contain no signal energy, and specifically no reference signals. In some embodiments, spectrum estimation unit 48 sets the time period for averaging the received power measurement so as to allow sufficient averaging of TDD signals. The averaging time should typically be selected long enough so that it will include downlink energy even in a cell with no active users.

For example, an LTE-TDD signal comprises at least one 1 mS downlink sub-frame every 5 mS, and the averaging can therefore be set to 5 mS or higher. As another example, a TD-SCDMA signal comprises at least one 0.66 mS downlink slot every 10 mS, and the averaging can therefore be set to 10 mS or higher.

Although the embodiments described herein mainly address spectrum estimation in communication terminals, the methods and systems described herein can also be used in other applications that involve classification or analysis of signal spectrum, such as in test equipment.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving a signal in a communication terminal;
estimating, based on the received signal, a power spectral density that the signal would have under full-load conditions of a transmitter transmitting the signal, by defining multiple hypotheses, each hypothesis specifying a respective set of one or more of time-frequency bins in which the signal is hypothesized to comprise reference signals, measuring a respective received power level of the signal in each of the sets, selecting a hypothesis in which the received power level is maximal, and estimating the power spectral density under the full-load conditions based on the selected hypothesis; and
performing an operation in the communication terminal using the estimated power spectral density.

2. The method according to claim 1, wherein performing the operation comprises searching in the terminal, using the estimated power spectral density, for a Public Land Mobile Network (PLMN) with which to communicate.

3. The method according to claim 2, wherein performing the operation comprises identifying a Radio Access Technology (RAT) used by the PLMN.

4. The method according to claim 1, wherein defining the hypotheses comprises specifying the time-frequency bins of the multiple hypotheses in a given frequency sub-band, and wherein estimating the power spectral density under the full-load conditions comprises substituting the measured power level of the selected hypothesis to serve as the estimated power spectral density for the frequency sub-band.

5. The method according to claim 4, wherein estimating the power spectral density comprises processing the frequency sub-band independently of other frequency sub-bands of the signal.

6. The method according to claim 1, wherein defining the multiple hypotheses comprises, for a communication protocol that transmits the reference signals in one or more predefined patterns of the time-frequency bins, defining multiple shifts, in at least one of time and frequency, that cover possible shifts of the predefined patterns.

7. The method according to claim 6, wherein the one or more predefined patterns correspond to respective reference symbol patterns used by transmit antennas of the transmitter.

8. The method according to claim 1, wherein defining the hypotheses comprises defining multiple time shifts of a predefined pattern of the reference signals, wherein selecting the hypothesis comprises choosing, for each frequency bin, the hypothesis having the maximal received power level for the frequency bin, and wherein estimating the power spectral density comprises substituting the maximal received power level to serve as the estimated power spectral density for the frequency bin.

9. The method according to claim 8, wherein estimating the power spectral density comprises computing a maximum of the maximal received power level over the frequency bin and one or more neighboring frequency bins, and substituting the computed maximum to serve as the estimated power spectral density for the frequency bin.

10. The method according to claim 1, wherein receiving the signal comprises receiving a Time Division Duplex (TDD) signal having a period, and wherein measuring the received power level comprises evaluating the power level over at least the period.

11. Apparatus, comprising:
reception circuitry, which is configured to receive a signal over a mobile telecommunications air interface; and
a processor, which is configured to estimate, based on the received signal, a power spectral density that the signal would have under full-load conditions of a transmitter transmitting the signal, by defining multiple hypotheses, each hypothesis specifying a respective set of one or more of time-frequency bins in which the signal is hypothesized to comprise reference signals, measuring a respective received power level of the signal in each of the sets, selecting a hypothesis in which the received power level is maximal, and estimating the power spectral density under the full-load conditions based on the selected hypothesis, and to perform an operation using the estimated power spectral density.

12. The apparatus according to claim 11, wherein the processor is configured to search, using the estimated power spectral density, for a Public Land Mobile Network (PLMN) with which to communicate.

13. The apparatus according to claim 12, wherein the processor is configured to identify a Radio Access Technology (RAT) used by the PLMN.

14. The apparatus according to claim 11, wherein the processor is configured to specify the time-frequency bins of the multiple hypotheses in a given frequency sub-band, and to estimate the power spectral density under the full-load conditions by substituting the measured power level of the selected hypothesis to serve as the estimated power spectral density for the frequency sub-band.

15. The apparatus according to claim 11, wherein, for a communication protocol that transmits the reference signals in one or more predefined patterns of the time-frequency bins, the processor is configured to define the multiple hypotheses by defining multiple shifts, in at least one of time and frequency, that cover possible shifts of the predefined patterns.

16. The apparatus according to claim 11, wherein the processor is configured to define the hypotheses by defining multiple time shifts of a predefined pattern of the reference signals, to choose, for each frequency bin, the hypothesis having the maximal received power level for the frequency bin, and to estimate the power spectral density by substituting the maximal received power level to serve as the estimated power spectral density for the frequency bin.

17. A communication terminal comprising the apparatus of claim 11.

18. A chipset for processing signals in a communication terminal, comprising the apparatus of claim 11.

* * * * *